United States Patent [19]
Topf, Jr.

[11] Patent Number: 5,385,431
[45] Date of Patent: Jan. 31, 1995

[54] FLOW CONDUIT FOR TRAVERSING A TRAFFIC WAY

[75] Inventor: Henry E. Topf, Jr., Roachdale, Ind.

[73] Assignee: Miller Pipeline Corporation, Indianapolis, Ind.

[21] Appl. No.: 52,151

[22] Filed: Apr. 23, 1993

[51] Int. Cl.⁶ .................................................. F16L 1/00
[52] U.S. Cl. .................................. 405/157; 138/105; 285/176; 405/154
[58] Field of Search ............... 405/157, 154, 169, 170, 405/171, 60, 61, 62; 285/176; 138/105, 106, 119, 157; 404/14, 15, 3; 52/126.5, 126.6, 220.3, 220.5, 220.1, 126.2

[56] References Cited

U.S. PATENT DOCUMENTS

| | | | |
|---|---|---|---|
| 894,168 | 7/1908 | Smith | 405/171 |
| 2,027,619 | 1/1936 | Rutherford . | |
| 2,049,184 | 7/1936 | Walsleben . | |
| 2,134,393 | 10/1938 | Bennett . | |
| 2,343,029 | 2/1944 | Schmidt et al. . | |
| 2,397,655 | 4/1946 | Francis | 285/176 |
| 3,473,339 | 10/1969 | Schlafly | 405/157 |
| 3,552,780 | 1/1971 | Warren | 285/176 |
| 3,734,137 | 5/1973 | Stanley | 138/105 |
| 3,863,679 | 2/1975 | Young . | |
| 4,228,978 | 10/1980 | Rand . | |
| 4,258,515 | 3/1981 | Owen . | |
| 4,522,531 | 6/1985 | Thomsen et al. . | |
| 4,744,695 | 5/1988 | Lindsey et al. | 285/176 X |
| 4,794,956 | 1/1989 | Gordon et al. . | |
| 5,267,367 | 12/1993 | Wegmann | 52/220.5 X |

*Primary Examiner*—Dennis L. Taylor
*Attorney, Agent, or Firm*—Barnes & Thornburg

[57] ABSTRACT

An apparatus is provided for conveying flow across a traffic way between a first flow conduit and a second flow conduit. The apparatus includes a ramp member defining an interior region, a first coupling attachment coupling to the first flow conduit for delivering flow to the interior region, a second coupling attachment coupling to the second flow conduit to deliver flow from the interior region to the second flow conduit, and connectors for connecting both coupling attachments to opposite ends of the ramp member. A kit having components to allow assembly of such an apparatus in the field is also provided. A method for conveying flow across a traffic way between a first flow conduit and a second flow conduit is also provided.

37 Claims, 2 Drawing Sheets

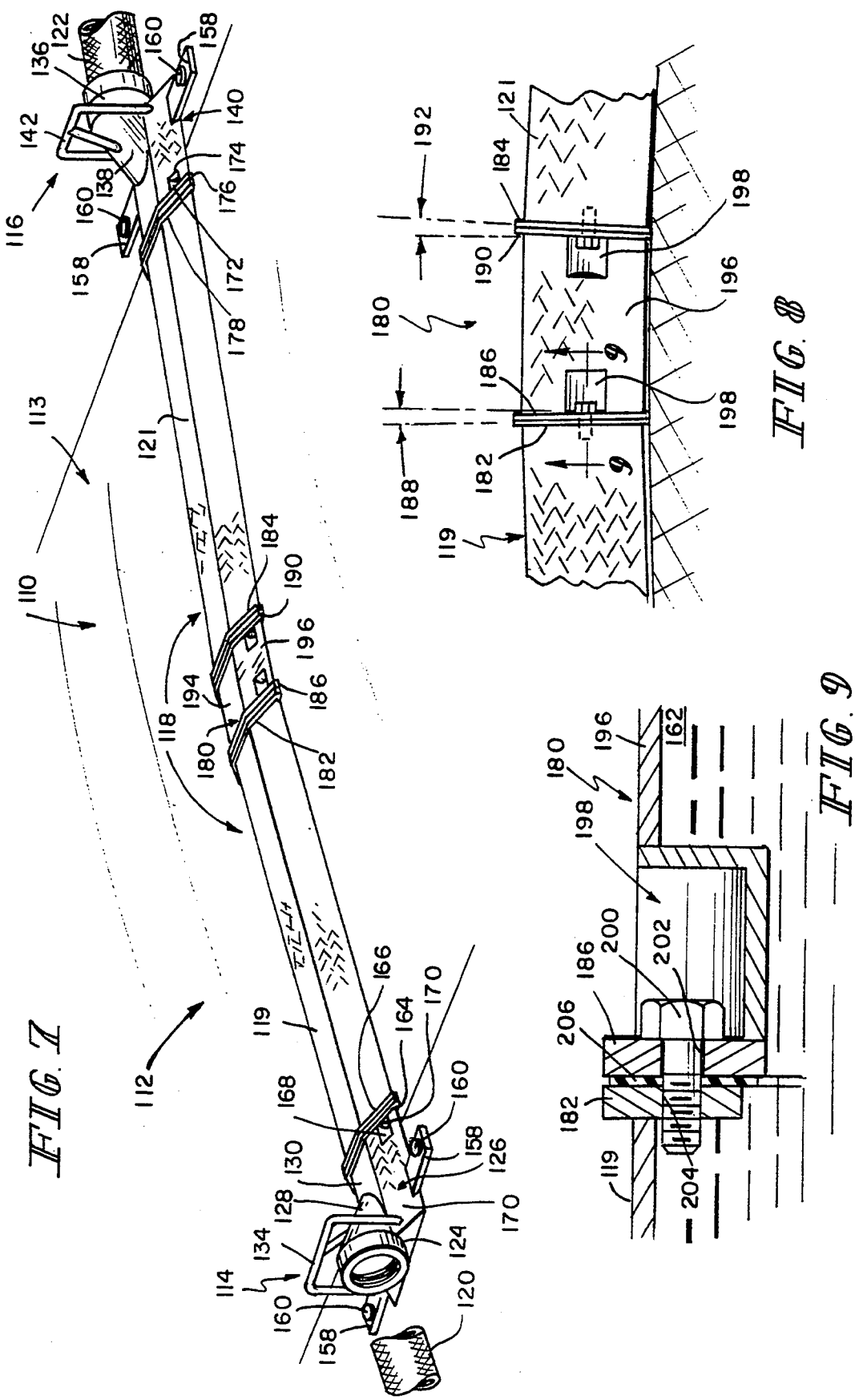

FLOW CONDUIT FOR TRAVERSING A TRAFFIC WAY

BACKGROUND AND SUMMARY OF THE INVENTION

The present invention relates to a flow conduit useful in operations involving repair of waste water mains or other underground conduits. More particularly, the present invention relates to a flow conduit designed for traversing a traffic way to allow flow to be bypassed around a repair area.

In the repair of underground waste water mains and other buried pipelines, it is generally necessary to route flow around the repair area to facilitate repair operations and to minimize the interruption in services. Typically, a flexible hose or the like is placed to receive flow at a point upstream of the repair site and is extended to deliver flow to an area downstream of the repair site. Normal flow through the buried pipeline bypasses the repair area by way of the flexible hose.

However, this approach to accomplishing flow bypassing is not entirely satisfactory. In most settings, the flexible hose must be extended across vehicular or pedestrian traffic ways or across entrance to commercial buildings and parking lots, interrupting traffic flow and causing potential safety problems. Conventional above-ground hoses may leak upon exposure to heavy vehicle traffic. These problems are exacerbated when the traffic way to be traversed is exceptionally wide or where the traffic flow is particularly heavy.

Moreover, flexible hoses pose numerous hazards when extended across traffic ways. Flexible hoses can be relatively easily torn or punctured in the course of normal repair operations, resulting in leakage and potential added expense to the repair operation. Such hoses can be damaged even by pedestrian traffic, but are particularly susceptible to damage by vehicular traffic. Vehicular traffic traversing flexible bypass hoses may easily destroy or damage the hoses, or may temporarily constrict flow, potentially disrupting repair operations.

The problem of safely conveying flow across a traffic way with minimal disruption arises in other settings as well. In chemical plants or other manufacturing facilities, it is often necessary to convey potable water or an enormous variety of other liquids and slurries across traffic ways. While flow conduits may simply be buried under the traffic way in such instances, this may not always be desirable. For example, where equipment configurations are expected to change rapidly, flow requirements may also change, such that use of a permanent buried flow conduit may not be cost effective. Permanent buried flow conduits may also be undesirable where, for example, the flow conduit must traverse a specialty concrete floor inside a manufacturing facility.

It would be desirable to provide a bypass conduit which avoids traffic interruption and resists breakage. It also would be desirable to provide a bypass conduit which is adaptable to traverse multi-lane traffic ways while still allowing traffic access to the traffic way while repair operations are being conducted. It further would be desirable to provide a bypass conduit which can be easily transported by operators between job sites and which is versatile so as to be usable with a variety of underground pipelines or other conduits at a variety of sites.

According to the present invention, an apparatus is provided for conveying flow across a traffic way between a first flow conduit and a second flow conduit. The apparatus includes a first coupling attachment coupling to the first flow conduit, a second coupling attachment coupling to the second flow conduit, and a ramp member extending between the first flow conduit and the second flow conduit. The ramp member includes a base plate, a top plate, and a pair of angled side walls extending between the top plate and the base plate to form a low-profile ramp over which traffic can safely pass. The base plate, top plate, and side walls cooperate to define an interior region for flow. Flow from the first flow conduit passes through the first coupling attachment, then through the interior region, and finally through the second coupling attachment to reach the second flow conduit.

In preferred embodiments, the apparatus also includes means for connecting the first coupling attachment to the ramp member and means for connecting the second coupling attachment to the ramp member. Advantageously, an operator can remove a coupling attachment where necessary and connect a plurality of ramp segments in serial connection to traverse a wide traffic way.

An adapter is provided to couple one ramp segment to another ramp segment. Illustratively, the adapter has first and second faces angled from the vertical. The adapter can be connected between a pair of ramp segments to arrange the ramp segments at an angle to one another. Advantageously, this allows a pair of ramp segments to be affixed flush to a crowned roadway.

A method is provided in accordance with the present invention for conveying flow across a traffic way between a first flow conduit and a second flow conduit. The method comprises the steps of positioning a ramp member to extend across a traffic way, attaching first and second coupling attachments to the ramp member, and connecting the first and second flow conduits to the first and second coupling attachments respectively.

A kit also is provided in accordance with the present invention. The kit comprises a plurality of coupling attachments of varying inside diameters, each of the coupling attachments including means for connecting to a first or a second flow conduit. The kit further comprises a plurality of ramp segments of varying lengths, each ramp segment defining an interior region for fluid flow. The kit also comprises means for attaching a selected coupling attachment to a selected ramp segment so that flow can pass from the flow conduit through the coupling attachment to the interior region. Advantageously, the kit provides versatility and allows operators at the job site to adapt the device to widely varying conditions.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which:

FIG. 7 is a perspective view of another apparatus in accordance with the present invention showing a pair of ramp segments connected by way of an adapter to form a predetermined angle so that the ramp members can rest upon a crowned surface;

FIG. 8 is an enlarged partial side view of the adapter of FIG. 7 connected to a pair of ramp segments; and FIG. 9 is an enlarged partial sectional view taken along lines 9—9 of FIG. 8 showing the connection between the adapter and a ramp segment.

DETAILED DESCRIPTION OF THE DRAWINGS

The present invention provides a rigid, hollow, ramp-shaped member extending between a pair of flow conduits to convey liquid flow across a traffic way, particularly to facilitate repair operations requiring liquid flow bypass. The ramp member can withstand pedestrian and vehicular traffic with minimum potential for liquid flow cut-off or leakage.

Figure 1:
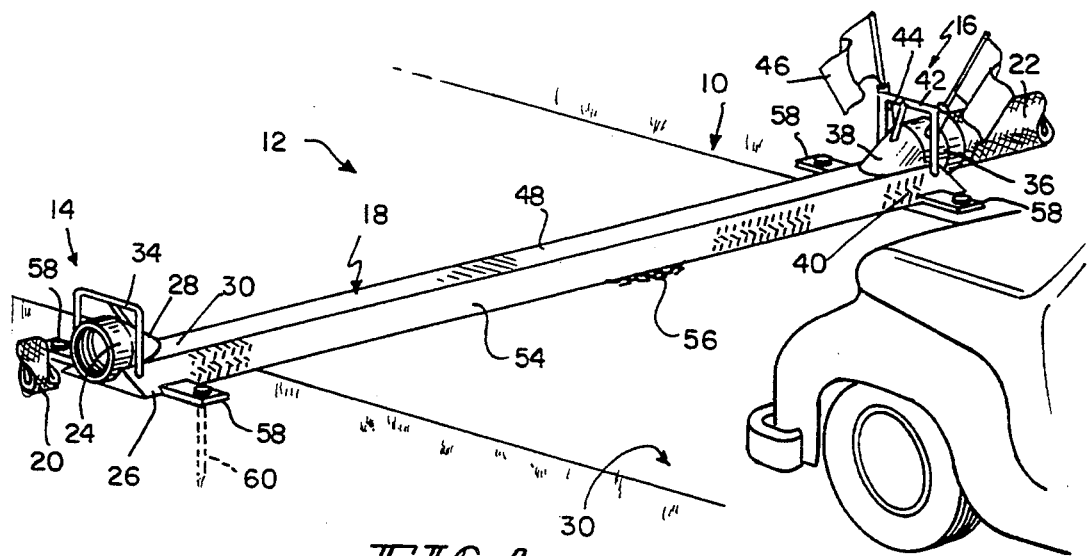
FIG. 1 is a perspective view of an apparatus in accordance with the present invention in use to convey flow across a traffic way.

A plan view of an apparatus in accordance with the present invention is illustrated in FIG. 1. An apparatus 10 is shown extending across a traffic way 12 to convey liquid flow conveniently without disrupting vehicular traffic 13. Apparatus 10 includes a first coupling attachment 14, a second coupling attachment 16, and a ramp member 18 extending between coupling attachments 14, 16 across traffic way 12. First coupling attachment 14 provides means for coupling ramp member 18 to a first flow conduit 20. First flow conduit 20 is typically a standard flexible bypass "pumping discharge" hose of the type commonly used in wastewater bypass operations and is connected to a source of wastewater flow (not shown). Second coupling attachment 16 provides means for coupling ramp member 18 to a second flow conduit 22, which is also typically a standard flexible discharge hose.

Figure 2:
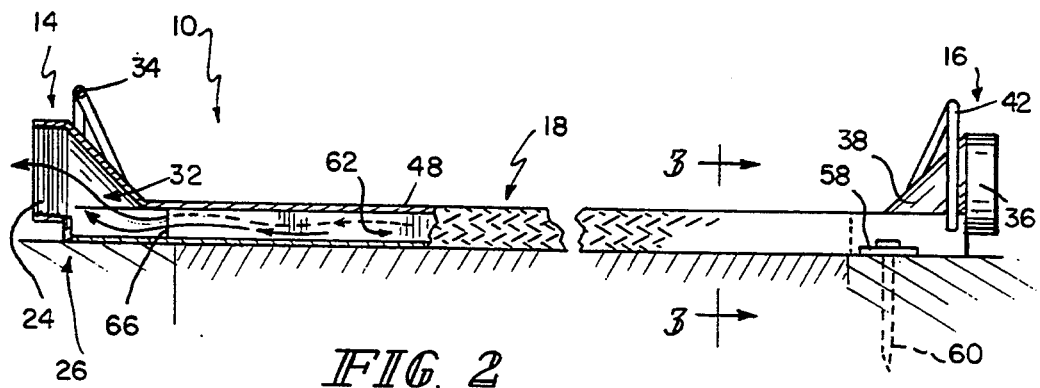
FIG. 2 is a side elevation view of the apparatus of FIG. 1 with portions broken away.

As shown best, for example, in FIG. 2, first coupling attachment 14 includes a threaded cylindrical portion 24 sized to receive an end of first flow conduit 20 in tight-fitting engagement to connect first flow conduit 20 and first coupling attachment 14 in fluid communication. Typically, first flow conduit 20 will be connected to cylindrical portion 24 by way of quick-disconnect couplings (not shown) or so-called Bauer couplings readily available to those of ordinary skill in the art.

First coupling attachment 20 also includes a ramp portion 26 integral with ramp member 18 and an angled conduit 28 extending between cylindrical portion 24 and ramp portion 26 to convey flow from cylindrical portion 24 to ramp portion 26. Angled conduit 28 is integral with cylindrical portion 24 and a top plate segment 30 of ramp portion 26. Top plate segment 30 is formed to include an opening 32 (shown in FIG. 2) for receiving flow from angled conduit 28.

It will be appreciated that the flow regime of fluid flowing from first flow conduit 20 through first coupling attachment 14 may change as the fluid passes from cylindrical portion 24 to angled conduit 28, and may change again when the fluid passes through opening 30 between angled conduit 28 and ramp portion 26. For example, if flow restrictions are presented at the transition between cylindrical portion 24 and angled conduit 28 due to a decreased diameter for flow, increased turbulence may result. Turbulent flow conditions may be desirable if the fluid carries a large proportion of debris, given that turbulent or agitated conditions may prevent the debris from settling out of the fluid and accumulating on interior surfaces of apparatus 10.

A handle 34 is attached to first coupling attachment 14 to provide for easy transport. Advantageously, handle 34 also provides a guard for first coupling attachment 14, minimizing the possibility that flexible hose 20 will be inadvertently disconnected from first coupling attachment 14.

Second coupling attachment 16 likewise includes a cylindrical portion 36, an angled conduit 38, and a ramp portion 40. A handle 42 may also be provided.

As shown in FIG. 1, second coupling attachment 16 may also be provided with holders 44 for receiving warning flags 46 or other warning markers. Warning flags 46 are positioned to alert pedestrians and motorists to the presence of ramp member 18 and to protect coupling attachment 16. Warning flags may also be mounted in holders (not shown) on first coupling attachment 14.

Ramp member 18 extends between first coupling attachment 14 and second coupling attachment 16 to provide means for defining an interior region for communicating flow between the first and second coupling attachments 14, 16 and across a traffic way 13. Ramp member 18 may be constructed from a variety of materials. For example, ramp member 18 may be manufactured from steel or aluminum. Preferably, ramp member 18 is manufactured from aluminum tread plate or other material that will provide a non-skid surface. Alternatively, ramp member 18 may be manufactured from fiberglass or even plastic. In high volume manufacturing, it may be desirable to manufacture ramp member 18 using an extrusion die.

Figure 3:
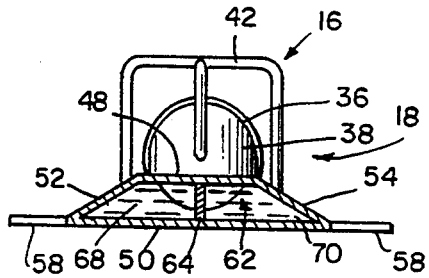
FIG. 3 is a sectional end view of the apparatus of FIGS. 1–2 taken along lines 3—3 of FIG. 2 showing a single centered reinforcement member, the entire interior region of the apparatus being available for flow.

As shown in FIG. 3, ramp member 18 includes a top plate 48, a base plate 50, and a pair of side walls 52, 54 angled to form a ramp. The angle of the side walls 52, 54 (and the resultant distance between base plate 50 and top plate 48) may vary, but is chosen so that top plate 48 is sufficiently low that a typical vehicle may traverse ramp member 18 without any contact between the vehicle undercarriage and top plate 48. Of course, the side walls 52, 54 are preferably angled so as to provide a relatively gentle slope so that vehicles can safely cross.

It may be desirable in some circumstances to provide a ramp member of semicircular cross-section (not shown) as an alternative to the ramp constructions illustrated herein. It would be necessary to select an appropriate material of construction to provide such a design with sufficient structural rigidity to withstand a traffic load and yet to allow relatively simple manufacturing techniques.

For safety purposes, top plate 48 and side walls 52, 54 of ramp member 18 may be covered with yellow-on-black tape. Other hazard markings may also be applied in readily visible locations on ramp member 18 to alert passing motorists or pedestrians as to the presence of ramp member 18 on the traffic way 13.

A chain 56 or the like is preferably attached to ramp member 18 as shown in FIG. 1 to allow apparatus 10 to be lifted by a forklift or other appropriate equipment for transport between job sites. It will be appreciated by those of ordinary skill in the art that a wide variety of handles or other access hooks can be provided for this function.

Apparatus 10 also includes four tie-downs 58 positioned at the corners of ramp member 18 or on opposite sides of ramp portions 52, 54. Pins 60 or the like (shown in dashed lines) are driven through openings formed in tie-downs 58 to secure apparatus 10 to the ground or other surface.

Top plate 48, base plate 50, and side walls 52, 54 cooperate to define an elongated interior region 62 for receiving fluid flow from first coupling attachment 14 and communicating that fluid flow to second coupling attachment 16. While it is desirable to keep interior region 62 as free as possible from obstructions to allow maximum flow volume, it is anticipated that internal support struts will be needed in interior region 62 to provide adequate structural rigidity to ramp member 18.

The number and positioning of the internal struts will vary for different applications. It may be necessary to provide only a single, centered strut 64 as shown in FIG. 3. Strut 64 extends between top plate 48 and base plate 50 to provide structural support along the length of ramp member 18. Advantageously, strut 64 extends in interior region 62 for the entire length of ramp member 18, but terminates at a predetermined distance from opening 32. If strut 64 extends too close to opening 32, strut 64 may obstruct flow into interior region 62, particularly if the flowing fluid is laden with debris which may accumulate at the upstream edge 66 of strut 64 (shown in FIG. 2) and clog the apparatus 10.

In the embodiment shown in FIG. 3, strut 64 bisects interior region 62 to provide a pair of side-by-side longitudinally extending channels 68, 70 for flow. Fluid entering interior region 62 splits at strut 64 and flows through side-by-side paths defined by channels 68, 70.

Figure 4:
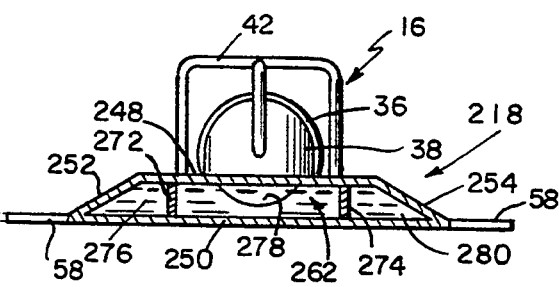
FIG. 4 is a sectional end view of another apparatus similar to that of FIGS. 1 and 2 showing a pair of side-by-side reinforcement members, the entire interior region of the apparatus being available for flow.

Similarly, where a larger flow volume is required, a modified ramp member 218 of the type shown in FIG. 4 may be needed. Ramp member 218 includes a top plate 248, a base plate 250, and a pair of angled side walls 252, 254 cooperating to define an interior region 262. A pair of struts 272, 274 extend through interior region 262 to define longitudinally extending channels 276, 278, and 280. In this configuration, flow passes through each of the side-by-side channels 276, 278, and 280.

Figure 5:
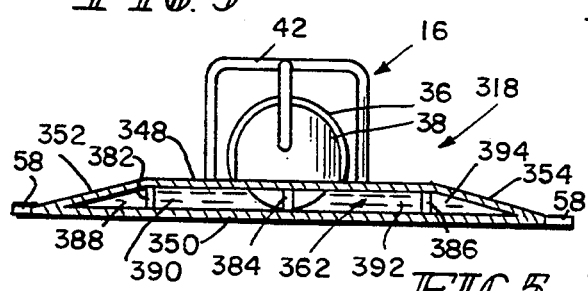
FIG. 5 is a sectional end view of yet another apparatus similar to that of FIGS. 1 and 2 showing multiple side-by-side reinforcement members, the entire interior region of the apparatus being available for flow.

Alternatively, a plurality of struts may be used, particularly where a relatively wide, relatively short ramp member is used. For example, in FIG. 5, a very low profile ramp member 318 includes a top plate 348, a base plate 350, and a pair of side walls 352, 354 cooperating to define a longitudinally extending region 362. Three longitudinally extending struts 382, 384, and 386 divide interior region 362 into four longitudinally extending flow channels 388, 390, 392, and 394.

Figure 6:
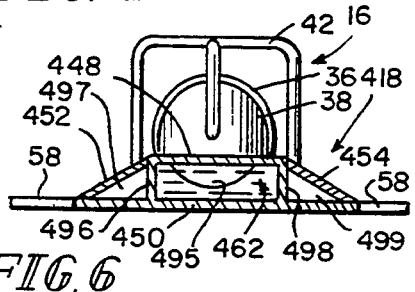
FIG. 6 is a sectional end view of another apparatus in accordance with the present invention showing a pair of side-by-side reinforcement members arranged so that only the central portion of the interior region is available for flow.

Alternative designs within the scope of the present invention contemplate the use of a pair of struts 496, 498 which do extend to opening 32 rather than terminating short of opening 32 as in the previous embodiments. Thus, in the configuration illustrated, for example, in FIG. 6, fluid flow is directed only into a central flow channel 495 to cause spaced-apart channels 497 and 499 to remain empty during flow of fluid through ramp member 418.

Another embodiment of the present invention is illustrated in FIGS. 7-9. In this embodiment of the invention, first and second means are provided for connecting the first and second coupling attachments to the ramp member.

In particular, an apparatus 110 (shown in FIG. 7) including a first coupling attachment 114, a second coupling attachment 116, and a ramp member 118 including a first ramp segment 119 and a second ramp segment 121. First coupling attachment 114 is provided with a ramp portion 126 having a coupling flange 164 on the downstream end thereof. A matching coupling flange 166 is provided on a first end of first ramp segment 119. It will be appreciated that a wide variety of alternatives may be used for connecting first coupling attachment 114 in tight-fitting engagement with ramp segment 119.

A cavity 168 is formed in angled side wall 170 of ramp portion 126 and another matching cavity (not shown) is likewise formed in the angled side wall on the opposite side of ramp portion 126. Cavity 168 is of sufficient size to accommodate a connector 170, preferably a bolt. Connector 170 is disposed in cavity 168 and extends through matching openings formed in flanges 164, 166.

Advantageously, no portion of connector 170 extends out of cavity 168. Thus, connector 170 provides no obstruction to traffic passing over the apparatus 110. Second coupling attachment 116 is likewise provided with cavities 172 housing connectors 174 to connect a flange 176 to a matching flange 178 on second ramp segment 121. A gasket or other seal may be inserted between coupling flanges 164, 166 and 176, 178 to prevent fluid leakage between the flanges. The same coupling arrangement is used between ramp segments 119, 121 and an angled adapter 180 as illustrated in more detail in FIG. 8 and described below.

Because apparatus 110 incorporates removable coupling attachments, it can be adapted for use at a wide variety of job sites. For example, the apparatus need not use merely a single ramp segment. Rather, a number of ramp segments can be joined in series so that the first coupling attachment 114 is connected to the initial ramp segment and second coupling attachment 116 is connected to the terminal ramp segment.

Advantageously, each ramp segment is provided with coupling flanges (e.g. coupling flanges 166, 182 on either end of first ramp segment 119 and coupling flanges 178, 184 on either end of second ramp segment 121 as shown in FIG. 7) which provide means for joining each ramp segment to an adjacent ramp segment. Of course, other commonly available connectors may be substituted for the matching coupling flanges shown in FIG. 7. Preferably, any alternative connectors either allow adjacent ramp segments to engage each other directly (as with coupling flanges) or receive a ramp portion between adjacent ramp segments.

An arrangement in which apparatus 110 includes a plurality of serially connected ramp segments will be necessary where, for example, a particularly wide traffic way must be crossed. A unitary ramp member of sufficient length to cross such a traffic way may be too unwieldy for convenient use in such a situation.

The use of removable coupling attachments 114, 116 also allows apparatus 110 to be assembled for use on crowned roadways such as crowned roadway 113 shown in FIG. 7. To ensure that ramp member 118 can be affixed flush with the surface of the crowned roadway 113, means must be provided for joining first ramp segment 119 to second ramp segment 121 at a predetermined angle. As shown in FIG. 8, an adapter 180 may be provided having a first flanged face 186 angled from the vertical at an angle 188 and a second flanged face 190 angled from the vertical at an angle 192. Preferably, adapter 180 also includes a ramp portion including a top plate segment 194, a base plate segment (not shown), an angled side wall segment 196, and an opposite matching angled side wall segment (not shown).

As shown in FIG. 9, adapter 180 is formed to include a pair of cavities 198 in side wall 196 (and in the opposite side wall) similar to cavities 168, 172. Cavity 198 (shown in more detail in FIG. 8) is of a depth sufficient to receive a bolt 200 or other connector so that no portion of the bolt 200 projects beyond the plane of side wall 196. An opening 202 is formed in coupling flange 186 and a matching opening 204 is formed in adjacent coupling flange 182. Bolt 200 extends through openings 202, 204 to connect flanges 186, 182 in tight-fitting engagement. A gasket 206 or other seal may be inserted between flanges 182, 186 to prevent leakage of flow from interior region 162.

The present invention further contemplates a method for conveying fluid flow across a traffic way between a first flow conduit and a second flow conduit, the method relying upon, for example, apparatus 10, 110, or the like as described herein. To practice a method using the apparatus of FIG. 7, for example, ramp member 118 is positioned to extend across a traffic way. First and second coupling attachments 114, 116 are attached to ramp member 118. First flow conduit 120 is connected to first coupling attachment and second flow conduit 122 is connected to second coupling attachment 116. Thus, fluid flow can first pass from first flow conduit 120 through first coupling attachment 114 to interior region 162, and then through second coupling attachment 116 to second flow conduit 122.

Ramp segments 119, 121 alternatively may be joined to each other at flanges 182, 184. First coupling attachment 114 will be attached to ramp segment 119 and second coupling attachment 116 will be attached to ramp segment 121. A number of ramp segments can be connected in series as described above.

An adapter 180 can be attached between ramp segment 119 and ramp segment 121 so that ramp segments 119, 121 are coupled at a predetermined angle as shown in FIG. 7. The predetermined angle is selected to allow the ramp segments 119, 121 to be affixed to one another to lie flush with the surface of crowned roadway 113.

It is anticipated that the apparatus of the present invention will be useful in a wide variety of settings. Accordingly, the apparatus must be versatile, easy to transport, and easy to repair. Thus, the present invention further contemplates a kit from which an apparatus such as apparatus 110 can be assembled in the field. The kit comprises a plurality of coupling attachments adapted for coupling to at least one of the first or the second flow conduits. The coupling attachments are of a variety of inside diameters to accommodate a variety of flow conduit sizes. The coupling attachments include, for example, threaded cylindrical portions (such as portions 124, 136) providing means for coupling to the first or the second flow conduit.

The kit further comprises a plurality of interchangeable ramp segments of varying lengths. The ramp segments may be connected in serial connection as previously described, connected by an angled adapter such as adapter 180, or may be used individually depending upon the application. The kit further comprises connectors (such as those described herein with reference to the embodiment of FIGS. 7-9) means for attaching the ramp segments to the coupling attachments.

Although the invention has been described in detail with reference to certain preferred embodiments, variations and modifications exist within the scope and spirit of the invention as described and defined in the following claims.

I claim:

1. An apparatus for conveying fluid flow across a traffic way between a first flow conduit and a second flow conduit, the apparatus comprising a vehicle drive-over ramp defining a sealed fluid-conducting conduit formed to include an interior fluid flow region and including a base plate, a first angled side wall appended to the base plate, a second angled side wall appended to the base plate, and a top plate extending between the pair of angled side walls, the base plate, top plate, and side walls cooperating On one side to define the interior fluid flow region and on an exterior opposite side defining the vehicle drive-over ramp for permitting a vehicle's running gear to pass over the fluid flow region by contacting the opposite sides and transversing the ramp's opposite sides while in contact therewith.

first coupling means for coupling the .vehicle drive-over ramp to the first flow conduit to allow fluid flow between the first flow conduit and the interior fluid flow region, and second coupling means for coupling the vehicle drive-over ramp to the second flow conduit to allow fluid flow between the interior fluid flow region and the second flow conduit.

2. The apparatus of claim 1, further comprising first connecting means for connecting the first coupling means to the ramp means and second connecting means for connecting the second coupling means to the ramp means.

3. The apparatus of claim 2, wherein the first connecting means includes a cavity formed in the first side wall, a cavity formed in the second side wall, and removable connectors extending through both cavities below the plane of the side wall so as not to present an obstruction to traffic passing over the side wall.

4. The apparatus of claim 1, wherein the ramp means includes a plurality of ramp segments and means for joining each ramp segment to an adjacent ramp segment to connect the plurality of ramp segments in serial connection.

5. The apparatus of claim 4, wherein each joining means includes a ramp portion including a top plate segment, a base plate segment, and a pair of angled side wall segments.

6. The apparatus of claim 1, wherein the ramp means includes a first ramp segment and a second ramp segment, and further comprising means for joining the first ramp segment to the second ramp segment at a predetermined angle corresponding to the angle of a crowned surface so that the first ramp segment and the second ramp segment can be affixed in engagement with the crowned surface.

7. The apparatus of claim 6, wherein the first ramp segment includes a first flange, the second ramp segment includes a second flange, and the joining means includes a first angled flange angled relative to vertical and mated with the first flange and a second angled flange angled relative to vertical and mated with the second flange.

8. The apparatus of claim 6, wherein the joining means includes a ramp portion including a top plate segment, a base plate segment, and a pair of angled side wall segments.

9. The apparatus of claim 1, wherein the first coupling means includes first engaging means for engaging the first flow conduit, second engaging means for engaging the ramp means, and an angled conduit extending between the first engaging means and the second engaging means to convey flow from the first engaging means to the second engaging means.

10. The apparatus of claim 9, wherein the second engaging means includes a ramp portion including a top plate segment, a base plate segment, and a pair of angled side wall segments.

11. The apparatus of claim 10, wherein the ramp portion includes a pair of angled side walls, further comprising a cavity formed in each of the side walls and removable connectors disposed in each cavity connecting the ramp portion to the ramp means.

12. The apparatus of claim 10, wherein the ramp portion includes a top plate formed to include an opening and the angled conduit connects to the top plate to convey flow through the opening.

13. The apparatus of claim 1, wherein the ramp means further includes a pair of spaced-apart walls extending between the top plate and the base plate in the interior region and cooperating with the top plate and the base plate to define a central flow channel receiving all flow from the first coupling means.

14. An apparatus for conveying fluid flow across a traffic way between a first flow conduit and a second flow conduit, the apparatus comprising
a rigid hollow vehicle drive-over ramp defining a sealed fluid-conducting conduit and including a first end and a second end, a base plate, a pair of angled side walls, and a top plate, each angled side wall being appended to the base plate along a first sealed edge and to the top plate along a second sealed edge, the base plate, side walls, and top plate cooperating on one side to define an interior fluid flow region and on an exterior opposite side defining the vehicle drive-over ramp for permitting a vehicle's running gear to pass over the fluid flow region by contacting the opposite sides and transversing the ramp's opposite sides while in contact therewith.
a first coupling attachment coupling to the first flow conduit to deliver fluid flow from the first flow conduit to the interior fluid flow region,
first connecting means for connecting the first coupling attachment to the vehicle drive-over ramp at the first end,
a second coupling attachment coupling to the second flow conduit to deliver fluid flow from the interior fluid flow region to the second flow conduit, and
second connecting means for connecting the second coupling attachment to the vehicle drive-over ramp at the second end.

15. The apparatus of claim 14, wherein the first coupling attachment includes a cavity formed in the first side wall, a cavity formed in the second side wall, and removable connectors disposed in both cavities below the plane of the side wall so as not to present an obstruction to traffic passing over the side wall.

16. The apparatus of claim 14, wherein the ramp member includes a plurality of ramp segments, each ramp segment including a coupling flange on its first end, a coupling flange on its second end, and connectors extending through the coupling flanges to connect each ramp segment to an adjacent ramp segment in series.

17. The apparatus of claim 14, wherein the ramp member includes a first ramp segment and a second ramp segment, further comprising an adapter including a first angled face and a second angled face, first connecting means for connecting the first segment to the first angled face, and second connecting means for connecting the second segment to the second angled face so that the first segment and the second segment form a predetermined angle corresponding to the angle of a crowned surface so that the ramp will rest upon the crowned surface.

18. The apparatus of claim 17, wherein the adapter includes a ramp portion including a top plate segment, a base plate segment, and a pair of angled side wall segments.

19. The apparatus of claim 14, wherein the first coupling attachment includes a cylindrical portion sized to receive an end of the first flow conduit, a ramp portion including a coupling flange to couple to the first end of the ramp member, and an angled conduit extending between the cylindrical portion and the ramp portion to convey flow from the cylindrical portion to the ramp portion.

20. The apparatus of claim 19, wherein the ramp portion includes a pair of angled side walls, further comprising a cavity formed in each of the side walls and removable connectors disposed in each cavity connecting the ramp portion to the ramp member.

21. The apparatus of claim 19, wherein the ramp portion includes a top plate formed to include an opening and the angled conduit connects to the top plate to convey flow through the opening.

22. The apparatus of claim 14, wherein the ramp member further includes a pair of spaced-apart walls extending between the top plate and the base plate in the interior region and cooperating with the top plate and the base plate to define a central flow channel receiving all flow from the first coupling attachment.

23. An apparatus for conveying fluid flow across a traffic way between a first flow conduit and a second flow conduit, the apparatus comprising
a vehicle drive-over ramp member defining a sealed fluid-conducting conduit and including a first end connected to the first flow conduit, a second end connected to the second flow conduit, a base plate, a pair of angled side walls, and a top plate, each angled side wall being appended to the base plate along a first sealed edge and to the top plate along a Second sealed edge, the base plate, side walls, and top plate cooperating on one side to define an interior fluid flow region receiving fluid flow at the first end and communicating fluid flow to the second end and on an exterior opposite side defining the vehicle drive-over ramp for permitting a vehicle's running gear to pass over the fluid flow region by contacting the opposite sides and transversing the ramp's Opposite sides while in contact therewith, and at least one longitudinally extending support member positioned between the top plate and the base plate to divide the interior region into at least two fluid flow channels communicating fluid flow from the first end to the second end in side-by-side relationship.

24. The apparatus of claim 23, further comprising two spaced-apart longitudinally extending support members dividing the interior region into a central flow channel and a pair of outside flow channels each communicating flow from the first end to the second end in side-by-side relationship.

25. The apparatus of claim 23, further comprising a pair of spaced-apart longitudinally extending support members cooperating to define a central flow channel communicating flow from the first end to the second end and a pair of outside regions blocked from receiving flow.

26. The apparatus of claim 23, further comprising a coupling attachment attached at the first end of the ramp member and attached to the first flow conduit, wherein the at least one support member terminates at the first end so that no portion of the support member extends into the coupling attachment.

27. The apparatus of claim 26, wherein the coupling attachment includes a cylindrical portion sized to receive and end of the first flow conduit, a ramp portion including a coupling flange to couple to the first end of the ramp member and a top plate formed to include an opening, and an angled conduit extending between the cylindrical portion and the top plate to convey flow from the cylindrical portion through the opening, the support member terminating a predetermined distance from the opening to allow flow to pass without obstruction through the opening.

28. A method for conveying fluid flow between a first flow conduit and a second flow conduit across a traffic way, the method comprising the steps of positioning a rigid, hollow, vehicle drive-over ramp member to extend across the traffic way, the vehicle drive-over ramp member including a first end and a second end and on one side defining an interior fluid flow region for flow and on an exterior opposite side defining the vehicle drive-over ramp for permitting a vehicle's running gear to pass over the fluid flow region by contacting the opposite sides and transversing the ramp's opposite sides while in contact therewith, attaching a first coupling attachment to the first end, attaching a second coupling attachment to the second end, connecting the first flow conduit to the first coupling attachment to allow fluid flow from the first flow conduit through the first coupling attachment to the interior fluid flow region, and connecting the second flow conduit to the second coupling attachment to allow fluid flow from the interior fluid flow region through the second coupling attachment to the second flow conduit.

29. The method of claim 28, further comprising the steps of joining a second ramp member to the ramp member at the second end, the second ramp member defining a second interior region for flow, and attaching the second coupling attachment to the second ramp member so that flow passes from the interior region of the ramp member to the second interior region of the second ramp member and then passes through the second coupling attachment to the second flow conduit.

30. The method of claim 28, further comprising the step of joining a second ramp member to the ramp member at a predetermined angle selected to enable the ramp members to engaged a crowned surface.

31. The method of claim 30, wherein the joining step includes the step of attaching an adapter between the first ramp member and the second ramp member, the adapter including a first angled face, a second angled face, first means for connecting the first ramp member to the first angled face, and second means for connecting the second ramp member to the second angled face so that the first ramp member and the second ramp member form a predetermined angle so that the first and second ramp members will rest upon a crowned surface.

32. A kit having component parts capable of being assembled in the field for providing an apparatus for conveying fluid flow across a traffic way between a first flow conduit and a second flow conduit, the kit comprising the combination of a plurality of coupling attachments of varying inside diameters, each coupling attachment including means for coupling to at least one of the first or the second flow conduit, a plurality of vehicle drive-over ramp segments of varying lengths, each segment on one side defining an interior ..fluid flow region for communicating flow and on an exterior opposite side defining the vehicle drive-over ramp for permitting a vehicle's running gear to pass over the fluid flow region by contacting the opposite sides and transversing the ramp's opposite sides while in contact therewith, and means for attaching selected ones of the plurality of coupling attachments to selected ones of the plurality of vehicle drive-over ramp segments so that fluid flow can pass through the coupling attachment to the interior region.

33. The kit of claim 32, further comprising means for joining one of the plurality of ramp segments to another of the plurality of ramp segments so that multiple ramp segments can be connected in serial connection.

34. The kit of claim 32, further including a plurality of adapters, each adapter including a first angled face, a second angled face, first means for connecting one of the plurality of ramp segments to the first angled face, and second means for connecting another of the plurality of ramp segments to the second angled face so that the connected ramp segments form a predetermined angle corresponding to the angle of a crowned surface to allow the ramp to rest upon the crowned surface.

35. An apparatus for conveying fluid flow across a traffic way between a first flow conduit and a second flow conduit, the apparatus comprising a sealed fluid-conducting vehicle drive-over ramp connecting the first flow conduit to the second flow conduit, the vehicle drive-over ramp being formed to include an interior fluid flow region and including an elongated base plate, an elongated first angled side wall appended to the base plate at a first sealed edge, an elongated second angled side wall appended to the base plate at a second sealed edge, and an elongated top plate extending between the pair of angled side walls and being appended to the pair of angled side walls at third and fourth sealed edges, the base plate, top plate, and side walls cooperating on one side to define the interior fluid flow region and on an exterior opposite side defining the vehicle drive-over ramp for permitting a vehicle's running gear to pass over the fluid flow region by contacting the opposite sides and transversing the ramp's opposite sides while in contact therewith, 36. The apparatus of claim 35, wherein the first angled side wall includes first ramping means for providing a positive slope to ramp the vehicle running gear engaging the first angled side wall onto the top plate, the second angled side wall includes second ramping means for providing a negative slope to ramp the vehicle running gear leaving the top plate and engaging the second angled side wall onto the traffic way, and the top plate includes bridge means for carrying vehicle running gear over the interior fluid flow region and interconnecting the first ramping means and second ramping means.

37. The apparatus of claim 35, wherein the first, second, third, and fourth sealed edges are in spaced-apart mutually parallel relationship.

* * * * *